(12) United States Patent
Sperling et al.

(10) Patent No.: US 8,102,530 B2
(45) Date of Patent: Jan. 24, 2012

(54) COLOUR MEASURING UNIT

(75) Inventors: Uwe Sperling, Gerestried (DE); Peter Schwarz, Koengisdorf (DE)

(73) Assignee: BYK-Gardner GmbH (DE)

( * ) Notice: Subject to any disclaimer, the term of this patent is extended or adjusted under 35 U.S.C. 154(b) by 548 days.

(21) Appl. No.: 12/267,301

(22) Filed: Nov. 7, 2008

(65) Prior Publication Data
US 2009/0122316 A1 May 14, 2009

(30) Foreign Application Priority Data

Nov. 9, 2007 (DE) .......................... 10 2007 053 574

(51) Int. Cl.
*G01J 3/50* (2006.01)
(52) U.S. Cl. ....................................... 356/402; 250/226
(58) Field of Classification Search .................. 356/402
See application file for complete search history.

(56) References Cited

U.S. PATENT DOCUMENTS

| | | | | |
|---|---|---|---|---|
| 5,917,183 | A | 6/1999 | Sperling | 250/238 |
| 6,836,325 | B2 * | 12/2004 | Maczura et al. | 356/328 |
| 6,870,617 | B2 * | 3/2005 | Norton et al. | 356/326 |
| 2005/0052648 | A1 * | 3/2005 | Frick et al. | 356/328 |
| 2008/0297791 | A1 * | 12/2008 | Imura | 356/306 |

FOREIGN PATENT DOCUMENTS

DE 4434266 3/1996

* cited by examiner

*Primary Examiner* — F. L. Evans
(74) *Attorney, Agent, or Firm* — Hayes Soloway P.C.

(57) ABSTRACT

A colour measuring unit (1) comprising a radiation device (2) which emits light onto a surface (9) to be examined, wherein the radiation device (2) comprises at least one semiconductor-based light source (6), and a radiation detector device (12) which receives at least a portion of the light scattered by the surface and outputs a signal characteristic of this light, wherein the radiation detector device (12) allows a spectral analysis of the light impinging thereon. According to the invention, the colour measuring unit comprises at least one sensor device (10) which determines at least one electrical parameter of the light source (6), and also a processor device (14) which outputs from this measured parameter at least one value characteristic of the light emitted by the radiation device (2).

21 Claims, 2 Drawing Sheets

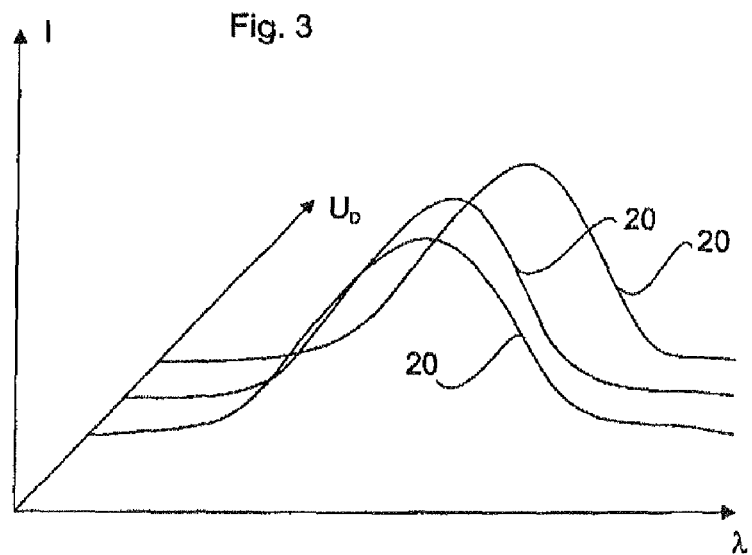
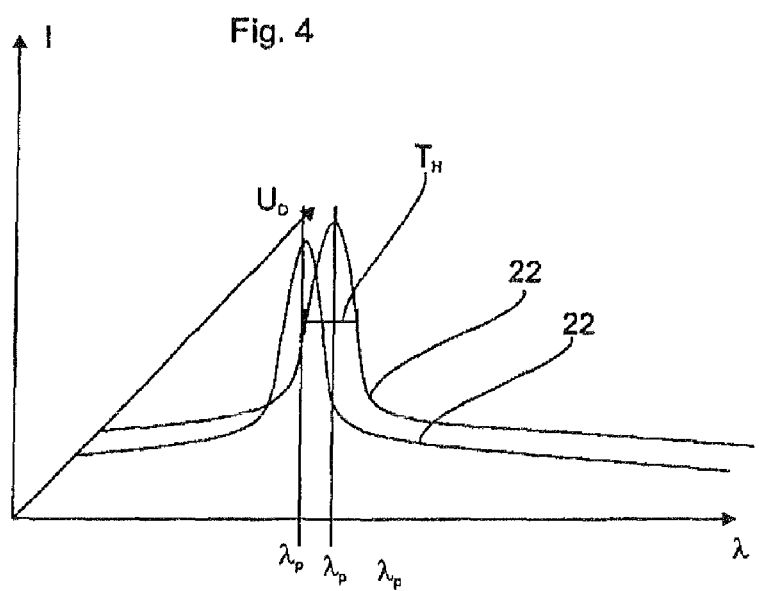

COLOUR MEASURING UNIT

The present invention relates to a method and an apparatus for determining surface properties, such as in particular, but not exclusively, the colour of the surface.

The invention will be described with reference to surfaces of motor vehicles. However, it is pointed out that the invention can also be used for other surfaces, such as for example in the case of coatings on items of furniture, floor coverings or the like.

The optical appearance of objects or their surfaces, particularly surfaces on motor vehicles, is largely determined by the surface properties thereof. Since the human eye is suitable only to a limited extent for objectively determining surface properties, there is a need for aids and equipment for the qualitative and quantitative determination of surface properties.

Apparatuses for determining surface properties, in particular for determining the colour of a surface in question, are known from the prior art. In these apparatuses, a radiation device is provided which throws radiation onto the measurement surface to be examined, and also a detector which receives and evaluates the radiation scattered and/or reflected by this measurement surface. As detectors, use is usually made of optical elements, such as monochromators, which allow an analysis of the radiation scattered and/or reflected by the surface with regard to its wavelength. However, the known apparatuses usually comprise at least two such monochromators, wherein one monochromator serves to analyse the light before it impinges on the surface to be examined, and a further monochromator serves to analyse the light after it has impinged on the surface. The need for this first monochromator in the prior art results from the fact that the illumination source itself can have a different emission characteristic depending on certain environmental parameters, such as in particular the temperature, and this emission characteristic also has to be taken into account in the measurement.

DE 44 34 266 B4 discloses a method for taking account of the temperature-dependence of optoelectronic diodes. Here, a relationship between a temperature of the diode and the forward voltage thereof is used to determine a correction function. In this method, however, only one sensor signal is taken into account, for example with regard to its intensity.

An object of the present invention is to provide an apparatus and a method which are easier to produce and to carry out, respectively.

A colour measuring unit according to the invention comprises a radiation device which emits light onto a surface to be examined, wherein the radiation device comprises at least one semiconductor-based light source, and the colour measuring unit furthermore comprises a radiation detector device which receives at least a portion of the light scattered by the surface and outputs a signal characteristic of this light. Furthermore, the radiation detector device allows a spectral analysis of the light impinging thereon.

According to the invention, the colour measuring unit comprises at least one sensor device which determines at least one electrical parameter of the light source, and also a processor device which outputs from this measured parameter at least one value characteristic of the light emitted by the radiation device.

Preferably, the radiation detector device is a monochromator or a similar device for analysing the light with regard to its spectral properties or components. In the colour measuring unit according to the invention, therefore, one or possibly even a plurality of detector devices are provided which receive the light scattered by the surface. A detector device in the form of a monochromator which receives the light before it impinges on the surface is therefore not provided. Instead of this cost-intensive radiation detector device, a measuring device is provided which determines an electrical parameter of the light source and in turn outputs from this parameter a measure of in particular the spectral distribution of the light emitted onto the surface. According to the invention, therefore, a determination of the spectral properties of the light takes place before said light impinges on the surface to be examined.

In one preferred embodiment, this value comprises a plurality of components which are associated with different spectral components of the light emitted by the radiation device. A value is therefore understood to mean in particular a spectrum or an array which associates intensities or intensity ratios with different spectral components or wavelengths. It is thus possible, knowing the electrical parameter such as the forward voltage or the forward current for example, to deduce the spectral distribution of the light emitted by the light source, so that in this way one monochromator can be omitted.

In a further advantageous embodiment, the apparatus comprises a memory device in which a plurality of electrical parameters are stored together with values associated therewith. More specifically, in each case a spectrum for the wavelength range relevant to the measurements is stored for different parameters, such as different forward voltages for example.

Furthermore, the processor device is configured in such a way that it associates a specific spectrum with each value of the measured electrical parameter. If a certain electrical parameter is not stored, it is possible for example to use interpolation methods or even possibly extrapolation to determine by calculation a spectrum which corresponds to the corresponding measured parameter.

Preferably, the electrical parameter is a forward voltage or a forward current of the semiconductor-based light source.

With particular preference, the light source is light-emitting diode and particularly preferably a white light-emitting diode. However, it would also be possible to provide light-emitting diodes in other colours or even a plurality of different light-emitting diodes.

The change in forward voltage with the temperature is dependent on the respective type of light-emitting diode and is usually between 2 and 10 mV/1° C. If, for example, the forward voltage is used as the electrical parameter, it is assumed that the light-emitting diode is activated with a constant current and then at the same time the forward voltage is measured. Conversely, however, it would also be possible to operate the light-emitting diode with a constant voltage source and to measure the current. In this case, the evaluation would take place in the same way via the measured current value.

For further details regarding the relationships between the forward current and the forward voltage, reference is made to the aforementioned patent DE 44 34 266 B4, which is hereby fully incorporated by way of reference into the content of the present disclosure.

Furthermore, it would also be possible to provide not just one light source but rather a plurality of light sources. For instance, the radiation device could comprise a further light source in addition to the white light-emitting diode. This further light source could be used for example to cover those spectral ranges which are not sufficiently filled by a white light-emitting diode.

In a further advantageous embodiment, the colour measuring unit comprises further radiation detector devices. In this case, however, these further radiation detector devices also serve to receive the light scattered or reflected by the surface. In this case, too, preferably one radiation detector device is inserted in the beam path in front of the surface to be examined.

The object on which the invention is based is also achieved by a colour measuring unit comprising a radiation device, wherein the radiation device emits light onto a surface to be examined, and at least one semiconductor-based light source. In addition, this colour measuring unit comprises a radiation detector device which receives at least a portion of the light scattered by the surface and outputs a signal characteristic of this light, wherein the radiation detector device allows a spectral analysis of the light impinging thereon. According to the invention, a movable light deflection element is provided between the radiation device and the surface and can be moved into a beam path running between the radiation device and the surface in such a way that light impinging thereon is deflected in the direction of the radiation detector device.

Instead of or in addition to the abovementioned sensor device, here the light coming from the radiation detector device is aimed onto the radiation detector device directly by the deflection element. Preferably, the deflection element is a mirror which can be pivoted or tilted for example about an axis. In this case, therefore, both the spectrum before impinging on the surface and the spectrum after impinging on the surface are determined by the radiation detector device.

The present invention also relates to an apparatus for calibrating a colour measuring unit and in particular a colour measuring unit of the type described above. Provided in said apparatus is an examination area in which the colour measuring unit can be accommodated, and also a heating device which allows a temperature control of this examination area within a predefined temperature range. Also provided is a light decoupling device which decouples the light emitted by the radiation device of the colour measuring unit and feeds it to a colour analysing device, wherein this colour analysing device allows a spectral analysis of the light impinging thereon.

As an alternative, it would also be possible to achieve a heating of the electrical components and in particular of the LEDs or LED chips in some other way, for example by means of a varying power supply to these components. The heating of the components could thus also be achieved by varying or maintaining the power supply thereto for a longer period of time, and the emission spectra which change as a result of this heating are recorded.

Preferably, this colour analysing device is once again a monochromator. The monochromator, which in the prior art is usually used in the colour measuring unit itself, is thus used here for the calibration of the colour measuring unit. More specifically, different temperatures are set in the examination area. As a function of these temperatures, the forward voltage of a corresponding light-emitting diode of the colour measuring unit also changes, and along with the forward voltage in turn also the spectral distribution of the light emitted by this light source. Overall, therefore, it is possible by means of measurements to establish and/or determine a relationship between a plurality of forward voltages or electrical parameters on the one hand and the spectral distributions brought about thereby on the other hand. This relationship will subsequently be used in the individual colour measuring units.

In one preferred embodiment, the apparatus comprises a memory device, in which a plurality of electrical parameters and also spectral distributions associated with these parameters are stored. Preferably, the colour analysing device is arranged outside the examination area, so that the actual measurement of the spectral distribution is not influenced by the effects of temperature.

The light decoupling device preferably comprises an optical fibre, wherein light coming directly from the light source of the colour measuring unit is coupled directly into one end thereof and said light is also decoupled at the other end of the optical fibre and is preferably passed to a monochromator. This light decoupling device is thus preferably guided out of the examination area.

The present invention also relates to a method for examining colour properties of surfaces. In a first step, light is emitted by means of a light source onto the surface to be examined. Furthermore, at least a portion of the light emitted onto the surface and scattered and/or reflected by this surface is detected, and this detected light is analysed with regard to its spectral properties. According to the invention, at least one electrical parameter of the light source is measured by means of a sensor device and, on the basis of this parameter, at least one value is used which is characteristic of the light emitted onto the surface.

Also in the method according to the invention, therefore, the light emitted onto the surface is not analysed directly but rather this analysis takes place indirectly via the measurement of the electrical parameter and the subsequent association of a given spectrum already measured beforehand. Preferably, the measurement of the electrical parameter takes place in the same period of time in which the analysis of the light with regard to its spectral properties also takes place. As a result, the two measurements can also be associated with one another with regard to their temporal relevance.

Preferably, on the basis of this parameter, a predefined determined spectral distribution of the light emitted onto the surface is used. Therefore, particularly when using white LEDs, in each case that spectrum is used which corresponds to the measured forward voltage. However, it would also be possible to use light-emitting diodes of other colours, such as for example red LEDs, and in this case not to use a complete spectrum but rather for example the wavelength at which a maximum light intensity occurs. This wavelength is once again also related to the measured electrical parameter, such as the forward voltage for example. Preferably, the measurements of the electronic parameter and the detection of the light scattered by the surface take place at essentially the same time, in order to ensure that the light impinging on the surface is correctly evaluated. Preferably, a time window in which these two measurements are carried out is less than 1 sec, preferably less than 0.5 sec and particularly preferably less than 0.25 sec.

In a further preferred method, in a calibration process which preferably takes place beforehand, for a plurality of electrical parameters of the light source, a plurality of spectral distributions associated therewith are determined for the light emitted by the light source. When using light sources of a certain colour, it may also be sufficient here to determine in each case the wavelength of the maximum intensity and the (absolute) intensity of the radiation at this wavelength.

Here too, therefore, a measured value association or table is produced which associates respective intensity distributions or spectra with the plurality of electrical parameters. Whereas in the prior art, therefore, both measurements are carried out in the colour measuring units in order to achieve a measurement result, here the calibration process is already carried out before the actual measurement operations. Preferably, during the calibration process, the forward voltage is measured at different temperatures and at the same time also the corresponding spectral distribution.

Further advantageous embodiments will emerge from the appended drawings:

In the drawings:

FIG. 3 shows a first example of recorded spectral distributions; and

FIG. 4 shows a further example of recorded spectral distributions.

Figure 1:
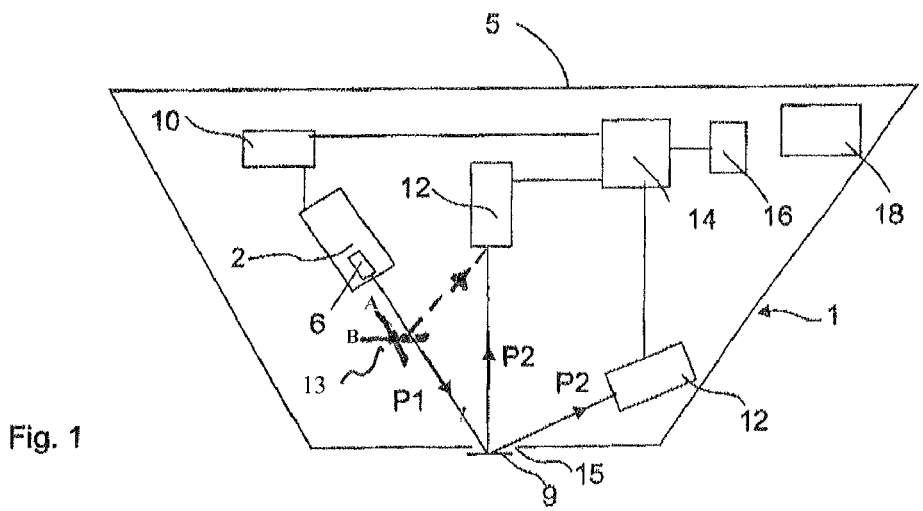
FIG. 1 shows a schematic diagram of a colour measuring unit according to the invention.

FIG. 1 shows in a highly schematic diagram a colour measuring unit 1 according to the invention. This colour measuring unit 1 comprises a radiation device 2 which emits light onto a surface 9 to be examined. This radiation device 2, along with the other components of the colour measuring device 1 which are described below, is accommodated in a housing 5. This housing 5 has an opening 15, through which the light can exit from the housing 5 and thus impinge on the surface 9. Apart from this, the housing 5 is preferably closed.

In the embodiment shown in FIG. 1, the radiation device 2 comprises at least one light source 6, preferably in the form of a white light-emitting diode. Instead of this, however, a plurality of light sources could also be provided, for example a plurality of white light-emitting diodes or else light-emitting diodes of different colour. By using light-emitting diodes of different colour, it is possible to start a colour spectrum in which the individual light-emitting diodes are switched on successively. It would also be possible to generate white light or approximately white light by using a plurality of light-emitting diodes of different colours.

Reference 12 denotes a radiation detector device which receives light that has in particular been scattered by the surface 9 and analyses said light with regard to its spectral components. Preferably, the radiation detector device is a spectrometer or a monochromator or polychromator. However, other dispersive optical elements may also be used. This spectrometer has an optical fibre input which preferably, through a gap, throws the light onto a grating and then directly carries out an evaluation of the spectral components.

As can be seen, no further radiation detector device is provided between the radiation device 2 and the surface 9. Reference 10 denotes a sensor device for measuring an electrical parameter such as, for example, the forward current $I_D$ or the forward voltage $U_D$. Also provided is a stabilising device which keeps constant another electrical parameter. If, for example, the forward voltage is measured, then the current is accordingly kept constant. If, on the other hand, it is the forward current which is measured, then the voltage applied to the light source 6 is kept constant. The measured forward voltage $U_D$ is passed to a processor device 14.

From this measured forward voltage $U_D$ or the forward current $I_D$, the processor device determines a spectral distribution associated with this electrical parameter. The colour measuring unit 1 according to the invention therefore does not measure the spectral distribution directly but rather determines the latter via the electrical parameter. For this purpose, a memory device 16 is also provided, in which a plurality of electrical parameters or values and spectral distributions associated therewith are stored. Instead of the spectral distributions, it is also possible, as explained in more detail below, to associate certain characteristic parameters such as, for example, a wavelength of maximum intensity, a full width at half maximum, and the like.

Reference 18 denotes a display device which outputs to the user a measured value for the wavelength or the spectral components of the light. In the embodiment shown in FIG. 1, a plurality of radiation detector devices 12 may also be provided which in each case receive at different angles the light scattered by the surface. In the example shown in FIG. 1, two such radiation detector devices 12 are shown. The radiation detector device 12 also passes a measured signal or the correspondingly measured spectrum to the processor device 14, and the latter then determines the colour appearance of the surface, wherein account is also taken in particular of the characteristic parameter measured by the sensor device 10 or the spectrum corresponding to this electrical parameter.

Movable light deflection element 13 may optionally be provided between the radiation device 2 and the surface 9 and can be moved from portion "A" into a beam path running between the radiation device 2 and the surface 9 (as shown in position "B" of FIG. 1) in such a way that light impinging thereon is deflected in the direction of the radiation detector device 12.

Furthermore, a plurality of radiation devices 2 could also be provided which emit radiation at different angles onto the surface 9 to be examined.

Figure 2:
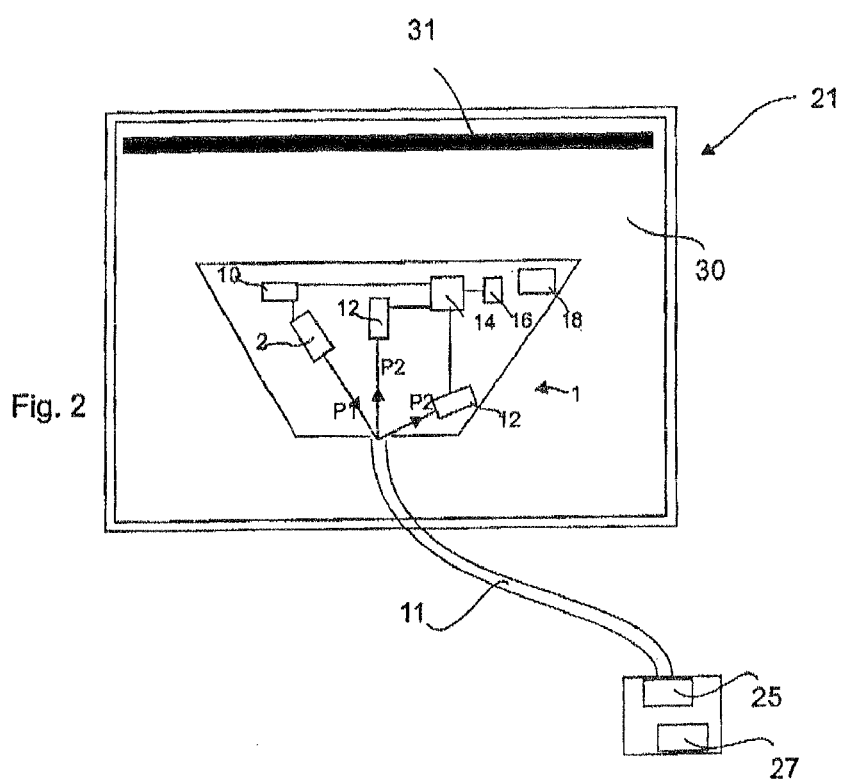
FIG. 2 shows a schematic diagram of an apparatus according to the invention for calibrating a colour measuring unit.

FIG. 2 shows an apparatus 21 for calibrating a colour measuring unit 1. This apparatus comprises an examination area 30, in which a heating device 31 is provided. In addition, it would also be possible to arrange a cooling device in the area so as to be able to set a larger temperature range within the examination area 30. Within the examination area 30, the temperature is then changed and in each case an electrical parameter such as the forward voltage $U_D$ or the forward current $I_D$ and at the same time a corresponding optical spectrum is recorded at respectively set temperature values. This optical spectrum is then associated with the electrical parameter in each case for example in the form of a table. In this way, it is possible to record a corresponding table in a predefined temperature range, for example between 20° and 70°.

Reference 11 denotes a light decoupling device for guiding light coming from the radiation device 2 out of the examination area 30.

In one preferred embodiment, supporting devices or holding devices may be provided which arrange the colour measuring unit 1 in a precisely defined position relative to the light decoupling device 11 or the optical fibre 11. Reference 25 denotes a detector device which may once again be for example a spectrometer or a monochromator. In a memory unit 27, the respectively measured forward voltages $U_D$ are stored together with the recorded spectra. For this, use may once again be made of the sensor device 10 which determines the electrical parameter. Said sensor device may transmit the respectively measured electrical parameters to the memory device 27 via lines or else in a wireless manner.

Furthermore, it is also possible that a processor device is provided which, on the basis of the measured data, determines a continuous spectrum for example by means of interpolation, which outputs a relationship between possible electrical parameters and the respectively resulting spectra. It is also possible that such a processor device extrapolates and outputs spectra even for those temperatures or electrical parameters which cannot be achieved in the examination area but which may occur in practice.

FIG. 3 shows in a highly schematic form a plurality of spectra 20 recorded for different forward voltages, i.e. also at different temperatures. It is pointed out here that the respective temperature is no longer required for the rest of the method, but the electrical parameter is once again dependent on the temperature. In this way, it is possible to record a plurality of such spectra along the axis $U_D$ and to store this respective association. This association is then stored in the memory device 16 of the colour measuring device 1 shown in FIG. 1. When a certain electrical parameter $U_D$ is then measured in a measurement operation, the corresponding spectrum is determined therefrom and used as a basis for the measurement. In the diagram shown in FIG. 3, spectra 20 are shown which may be obtained for example when using a white light-emitting diode. Here, the wavelength $\lambda$ is plotted on the x-axis and an intensity I is plotted on the y-axis.

FIG. 4 shows corresponding spectra which may occur for example when measuring single-coloured light-emitting diodes. Here, too, it would in principle be possible to associate the entire spectrum with the respective forward voltage $U_D$. Preferably, however, it is also possible here to use only two characteristic values of the spectrum, such as for example a wavelength $\lambda_P$ of maximum intensity and a full width at half maximum $T_H$. These values could also in turn be stored in the memory device 14 and used as a basis for future measurements.

All of the features disclosed in the application documents are claimed as essential to the invention in so far as they are novel individually or in combination with respect to the prior art.

LIST OF REFERENCES 1 colour measuring unit
2 radiation device
5 housing
6 light source
9 surface
10 sensor device
11 optical fibre
12 radiation detector device
13 movable light deflection element
14 processor device
15 opening
16 memory device
18 display device
21 apparatus for calibrating a colour measuring unit
25 detector device
27 memory device
30 examination area
31 heating device
$\lambda$ wavelength
$\lambda_P$ wavelength of maximum intensity
$U_D$ forward voltage
$I_D$ forward current
$T_H$ full width at half maximum
I intensity

The invention claimed is:

1. A colour measuring unit comprising:
a radiation device which emits light onto a surface to be examined, wherein the radiation device comprises at least one semiconductor-based light source;
a radiation detector device which receives at least a portion of the light scattered by the surface and outputs a signal characteristic of this light, wherein the radiation detector device allows a spectral analysis of the light impinging thereon;
at least one sensor device which measures at least one electrical parameter of the light source; and
a processor device which receives the at least one electrical parameter from the at least one sensor device and determines and outputs, based on the received electrical parameter, at least one value characteristic of the light emitted by the radiation device.

2. The colour measuring unit according to claim 1, wherein the value comprises a plurality of components which are associated with different spectral components of the light emitted by the radiation device.

3. The colour measuring unit according to claim 1, further comprising a memory device in which a plurality of electrical parameters are stored together with values associated therewith.

4. The colour measuring unit according to claim 1, wherein the electrical parameter is a forward voltage ($U_D$) or a forward current ($I_D$) of the light source.

5. The colour measuring unit according to claim 1, wherein the light source is a white light-emitting diode.

6. The colour measuring unit according to claim 5, wherein the radiation device comprises a further light source in addition to the white light-emitting diode.

7. The colour measuring unit according to claim 1, wherein the colour measuring unit comprises a plurality of radiation detector devices.

8. The colour measuring unit according to claim 1, further comprising a movable light deflection element, provided between the radiation device and the surface, which can be moved into a beam path running between the radiation device and the surface in such a way that light impinging thereon is deflected in the direction of the radiation detector device.

9. An apparatus for calibrating a colour measuring unit and in particular a colour measuring unit according to claim 1, comprising:
an examination area in which the colour measuring unit can be accommodated;
a heating device which allows a temperature control of the examination area within a predefined temperature range; and
a light decoupling device which decouples the light emitted by a radiation device of the colour measuring unit and feeds it to a colour analysing device which allows a spectral analysis of the light impinging thereon.

10. The apparatus according to claim 9, wherein the apparatus comprises at least one sensor device which determines at least one electrical parameter of a light source of the colour measuring unit.

11. The apparatus according to claim 9, wherein the apparatus comprises a memory device, in which a plurality of electrical parameters ($U_D$, $I_D$) can be stored.

12. The apparatus according to claim 9, wherein the colour analysing device is arranged outside the examination area.

13. The apparatus according to claim 9, wherein the light decoupling device comprises an optical fibre which leads out of the examination area.

14. A method for examining colour properties of surfaces, comprising the steps:
emitting light from a light source onto a surface to be examined;
detecting at least a portion of the light emitted onto the surface and scattered and/or reflected by this surface;
analysing the light with regard to its spectral properties;
measuring at least one electrical parameter of the light source; and
determining and outputting, based on the measured electrical parameter, at least one value characteristic of the light emitted by the radiation device.

15. The method according to claim 14, wherein the at least one value characteristic is determined based on a predefined determined spectral distribution of the light emitted onto the surface.

16. The method according to claim 14, wherein in a calibration process, for a plurality of electrical parameters of the light source, a plurality of spectral distributions associated therewith are determined for the light emitted by the light source.

17. An apparatus for calibrating a colour measuring unit according to claim 8, comprising:
- an examination area in which the colour measuring unit can be accommodated;
- a heating device which allows a temperature control of the examination area within a predefined temperature range; and
- a light decoupling device which decouples the light emitted by a radiation device of the colour measuring unit and feeds it to a colour analysing device which allows a spectral analysis of the light impinging thereon.

18. The apparatus according to claim 17, wherein the apparatus comprises at least one sensor device which determines at least one electrical parameter of a light source of the colour measuring unit.

19. The apparatus according to claim 17, wherein the apparatus comprises a memory device, in which a plurality of electrical parameters ($U_D$, $I_D$) can be stored.

20. The apparatus according to claim 17, wherein the colour analysing device is arranged outside the examination area.

21. The apparatus according to claim 17, wherein the light decoupling device comprises an optical fibre which leads out of the examination area.

* * * * *